United States Patent [19]

Eismann

[11] Patent Number: 5,760,899
[45] Date of Patent: Jun. 2, 1998

[54] HIGH-SENSITIVITY MULTISPECTRAL SENSOR

[75] Inventor: Michael T. Eismann, Beavercreek, Ohio

[73] Assignee: ERIM International, Inc., Ann Arbor, Mich.

[21] Appl. No.: 674,603

[22] Filed: Sep. 4, 1996

[51] Int. Cl.⁶ .................................................. G01J 3/28
[52] U.S. Cl. ................................... 356/326; 250/226
[58] Field of Search ............................. 356/326, 328, 356/402–411; 250/226

[56] References Cited

U.S. PATENT DOCUMENTS 5,173,748  12/1992  Bilhorn ............................. 356/328
5,276,321  1/1994  Chang et al. ........................ 250/226
5,371,353  12/1994  Chang et al. ........................ 250/226

*Primary Examiner*—K. Hantis
*Attorney, Agent, or Firm*—Gifford, Krass, Groh, Sprinkle, Patmore, Anderson & Citkowski

[57] ABSTRACT

A high-sensitivity sensor configuration improves upon airborne hyperspectral and multispectral sensing, particularly for thermal/infrared military target detection and/or identification. The invention combines dispersive spectrometer and filtered TDI detector techniques to provide improved NESR through increased dwell time, along with interband temporal simultaneity and spatial registration. Embodiments relating to hyperspectral, multispectral, and dual-band arrangements are disclosed.

11 Claims, 4 Drawing Sheets

HIGH-SENSITIVITY MULTISPECTRAL SENSOR

FIELD OF THE INVENTION

This invention relates generally to imaging spectrometers and, more particularly, to a sensor configuration which combines dispersive and filtered TDI detector techniques to realize an improved, high-sensitivity configuration, particularly for airborne thermal/infrared applications.

BACKGROUND OF THE INVENTION

The acquisition and processing of multispectral and hyperspectral data from airborne electro-optic/infrared (EO/IR) sensors has emerged in recent years as an important method for extracting information for remote imaging purposes. Examples range from geological studies and terrain classification to military target detection and identification. For the latter applications, there is considerable interest in applying multispectral techniques in the thermal infrared spectral region to support high confidence, day/night target detection and/or recognition.

Recent studies have indicated the presence of thermal multispectral signatures which theoretically enable such a capability. These color signatures in the thermal spectral region, however, are generally very subtle. Fortunately, the spectral correlation of backgrounds is generally sufficiently high to allow high confidence target detection even in the presence of relatively weak target color.

The requirements of an airborne thermal multispectral sensor are driven by the spectral and spatial properties of targets and backgrounds, and these requirements may be rather challenging if reliable multispectral signatures are to be preserved. From recent studies using sensitive, tower-based spectrometers, a measurement database relating to airborne sensor requirements has been developed. Thus far, the following primary requirements have been determined: (a) a very low sensor noise level; (b) moderately narrow spectral bands placed at specific locations (target and background dependent); (c) temporal simultaneity of the spectral channels; and (d) fine spatial registration between spectral channels.

Several sensor approaches have been developed and tested for airborne multispectral and hyperspectral imaging, each with its own merits and limitations. With respect to this invention, two design approaches in particular exhibit certain features of interest. The first approach is the dispersive imaging spectrometer, and the second is the filtered detector imaging spectrometer. Each will be discussed in turn.

THE DISPERSIVE IMAGING SPECTROMETER

FIG. 1 is a pictorial representation of a dispersive imaging spectrometer. The basic elements include a slit 102 at the image plane of the sensor fore-optics 104, a dispersive spectrometer module 106 containing a dispersive element 107, and a two-dimensional focal-plane sensor array 108. The slit 102 limits the field-of-view of the sensor 108 to a one-dimensional line of pixels, while the dispersive element 107 spreads the spectrum of these pixels in the cross-slit dimension onto the focal plane array of the sensor 108. As shown in FIG. 2, the result at any instant in time is a frame of data points containing a contiguous series of spectral channels, each with a one-dimensional image of the slit-limited field-of-view. In a conventional airborne sensor implementation, forward aircraft motion 101 is used to obtain the second image dimension from multiple frame sequences. Those of skill in the art are aware that there exists a variety of optical configurations for each of the various subassemblies.

The primary merits of the dispersive imaging spectrometer approach just described are: (1) no moving parts; (2) spectral channels which are sensed with essentially perfect simultaneity; and (3) very low noise performance. To achieve the low noise performance in the thermal spectral region, however, the sensor must be cryogenically cooled. When such cooling is provided, each detector element senses only radiation within the spectral channel passband. This results in minimal background noise, and is a favorable, distinguishing characteristic as compared to temporal or spatial Fourier transform spectrometer techniques.

Two important drivers associated with low noise include detector array performance and sensor throughput (etendue). Achieving high sensor throughput with a dispersive imaging spectrometer without seriously degrading spectral and spatial performance is the primary design challenge. Several spectrometer approaches have been studied to meet this challenge. The primary concerns of the dispersive imaging approach spectrometer are the effects of detector spatial noise and spatial-spectral distortion of the arrangement in terms of the spectral correlation of background measurements. Minimization of spatial-spectral distortion, in particular, is more difficult to achieve as sensor throughput is increased for better noise performance. This results in a constraining sensor trade-off for airborne operation where the allowable sensor dwell time is limited by platform dynamics. For example, consider a platform traveling at 120 knots (roughly 60 m/s) at an altitude of 1000 ft. With a 1 mrad IFOV (infrared field of view), the sensor must operate at 200 frames per second (5 msec dwell time) to achieve nominally 1 ft. of ground resolution. The theoretical lower limit to the cryogenically cooled sensor noise equivalent spectral radiance or NESR (i.e., background limit) is approximately $$NESR = \sqrt{\frac{hc}{\lambda} \frac{L_\lambda}{\eta A \Omega T_d \Delta \lambda}}$$

where $L_\lambda$ is the source spectral radiance, $\eta$ is the detector quantum efficiency, $A\Omega$ is the sensor throughput (including optical transmission), $T_d$ is the dwell time, and $\alpha\lambda$ is the spectral bandwidth for the spectral channel.

Based upon existing throughput and detector characteristics ($\eta=0.3$ in LWIR, 0.1 in MWIR), along with a 5 msec dwell time and 100 nm spectral bandwidth, an NESR of 0.26 $\mu W/cm^2 \mu msr$ is achievable at 4.7 microns and 0.23 $\mu W/cm^2 \mu msr$ at 10 microns for a 300K source. This sensitivity is approximately 4 to 5 times inferior to the desired noise performance. Some small gains (about a factor of 2) may be made using higher quantum efficiency detectors, but with a potential penalty in terms of spatial noise. Increasing sensor throughput is also a potentially difficult task due to the stringent spatial-spectral distortion requirements. This leaves dwell time as the only remaining variable. To increase dwell time with this sensor approach, however either the platform must fly slower or the sensor must backscan. The former may not be practical and the latter involves a potentially complicated pointing system. In both cases, the rate of ground coverage is sacrificed. Moreover, since the NESR is inversely proportional to the square root of the dwell time, this reduction in ground coverage is likely to exceed an order of magnitude.

THE FILTERED DETECTOR IMAGING SPECTROMETER

One alternative design approach to the dispersive imaging spectrometer is the filtered detector imaging spectrometer.

which utilizes an arrangement of filtered detectors in the focal plane of an imaging system including fore-optics 304 and relay optics 306. FIG. 3 is a pictorial representative of this approach. The basic concept utilizes a series of one-dimensional focal plane arrays such as 302 in the image plane, each filtered to a different spectral band of interest. Due to the lateral separation between detectors, there is a field shift between spectral channels, which, in an airborne operation, results in a time lag between spectral images. If the platform dynamics are precisely known or controlled, however, it is theoretically possible to register the spectral images, though, in practice, this is a somewhat difficult task.

The advantage of the filtered detector approach is that time-delay-integrate (TDI) techniques may be used to increase the effective integration time. Making reference to the focal plane layout shown in FIG. 4, the idea behind TDI is to shift the sensed charges from each line of detectors in conjunction with the image motion to provide a larger effective dwell time than allowed by the spatial resolution constraint for a non-TDI image sensor. This TDI operation is not achievable with the dispersive imaging spectrometer because of the spectral dispersion in the image motion direction. Problems associated with the filtered detector approach include the lack of temporal simultaneity in the spectral measurements and spatial misregistration in actual practice. Both of these problems result in spectral decorrelation, which is a primary characteristic to be preserved.

SUMMARY OF THE INVENTION

In an imaging spectrometer of the type including a focal-plane array having a dispersive dimension, this invention improves upon the existing art by providing a focal-plane arrangement having one or more sets of detector array segments, each such segment being laterally shifted in the dispersive dimension and optically filtered to spatial register the dispersion associated therewith. Fore-optics are provided which enable each set of detector array segments to view a different field angle of a scene of interest, and electronic circuitry, coupled to the focal-plane arrangement, is operative to perform a time-delay-integrate (TDI) operation on a segment-by-segment basis and generate a spectral image representative of the scene of interest. In a typical configuration, at least the fore-optics and focal-plane arrangement are airborne to gather data in a second dimension during flight and image the data onto replicated sets of detector elements. Depending upon the application, the spectral image may be thermally based. In one embodiment, TDI operation is performed with respect to an individual segment to achieve a hyperspectral sensing configuration. In an alternative embodiment, the TDI operation is performed with respect to multiple, overlapping segments to achieve a multispectral sensing configuration. The invention is also applicable to other sensor arrangements, including dual-band framing.

A high-sensitivity imaging spectrometer according to the invention might therefore include:

a platform moving in a first spatial dimension relative to a field of interest;

fore-optics supported on the platform to collect optical energy in the form of a plurality of multispectral segments, each at a different field angle;

a dispersive module operative to wavelength separate each multispectral segment into a plurality of individual wavelength channels, each channel including a plurality of data points arranged along a second spatial dimension;

a focal-plane image sensor having a two-dimensional array of optoelectric detector elements arranged as rows and columns, the image sensor being supported relative to the dispersive module such that the wavelength channels of the multispectral segments fall onto different rows of the image sensor, with the data points within the wavelength channels falling onto different columns of the image sensor;

a plurality of wavelength-specific filters disposed in an optical path between the dispersive module and the focal-plane image sensor, each filter being matched to selectively pass the various individual wavelength channels; and electronic circuitry in electrical communication with the optoelectric elements of the focal-plane image sensor, the circuitry being operative to generate a spectral image representative of the field of interest.

DETAILED DESCRIPTION OF THE PREFERRED EMBODIMENT

As discussed in the Background of this invention, the dispersive imaging spectrometer approach exhibits many attractive features for airborne hyperspectral or multispectral sensing, but is somewhat constrained in achieving an improved NESR. The instant invention improves upon the dispersive approach by allowing TDI operation, thereby achieving better noise performance without causing a reduction in sensor coverage or requiring higher sensor throughput (and degraded spatial-spectral properties).

Figure 1:
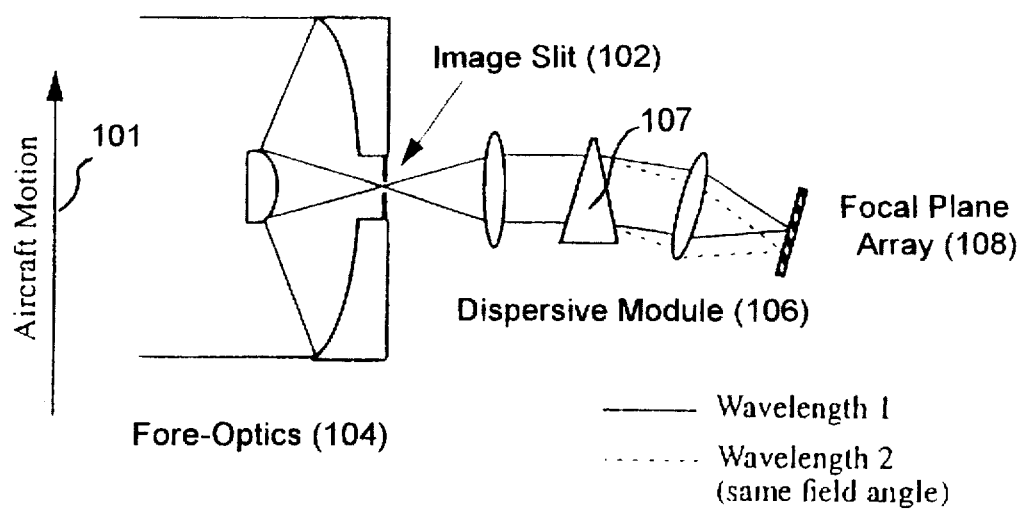
FIG. 1 is a schematic illustration of a prior-art dispersive imaging spectrometer arrangement.
Figure 2:
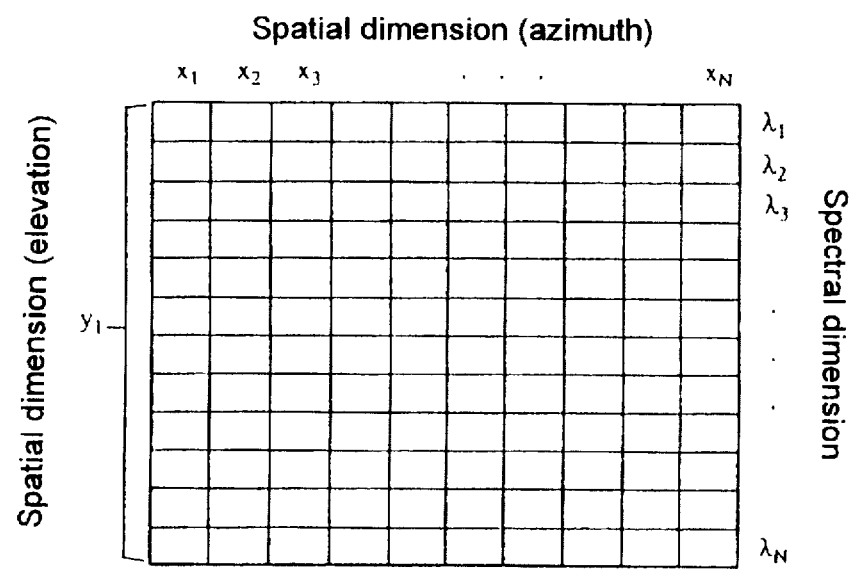
FIG. 2 represents a focal plane layout of the dispersive imaging spectrometer of FIG. 1.
Figure 3:
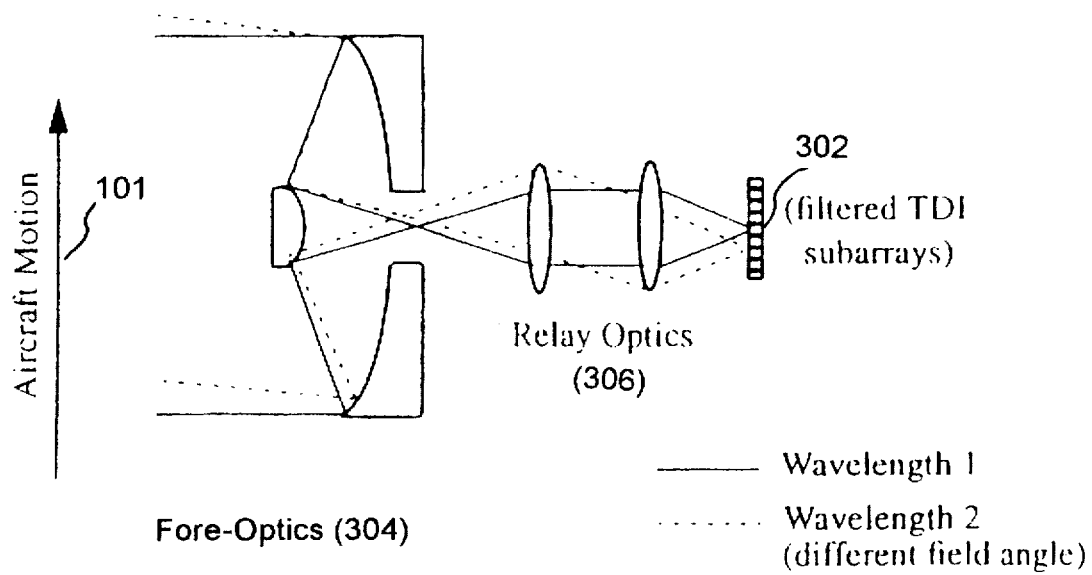
FIG. 3 is a pictorial of a prior-art filter detector imaging spectrometer.
Figure 4:
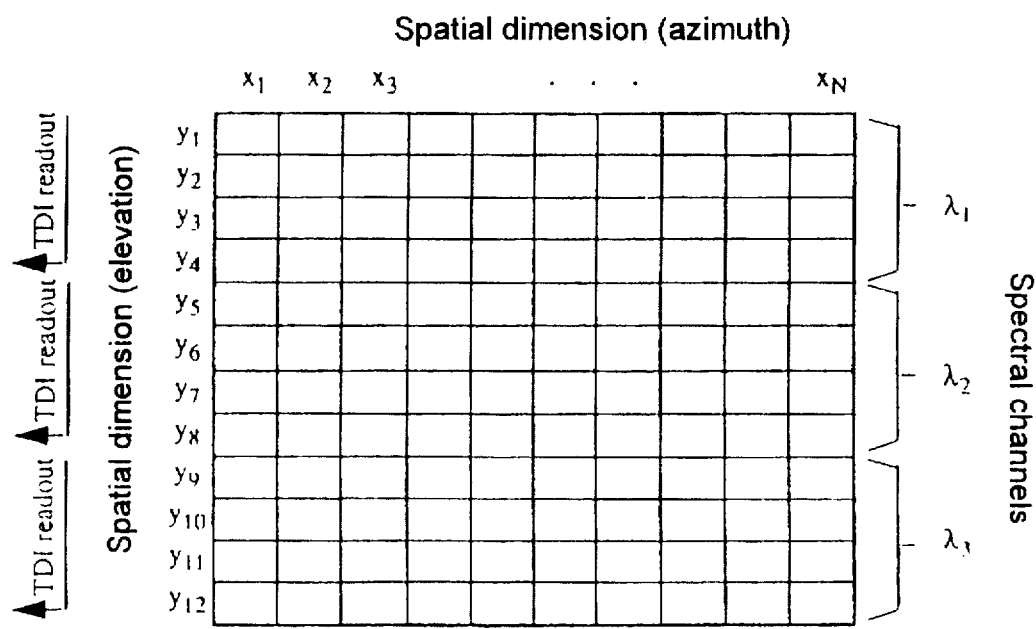
FIG. 4 represents a focal plane layout of the filter detector imaging spectrometer of FIG. 3.
Figure 5:
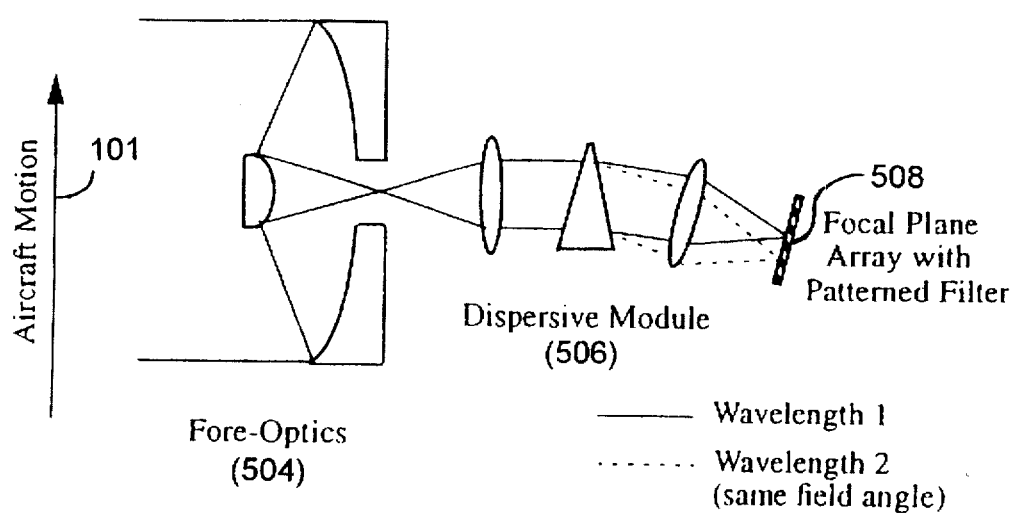
FIG. 5 is a pictorial of a time-delay-integrate (TDI) dispersive imaging spectrometer according to the present invention.

As illustrated in FIG. 5, the optical train, which includes fore-optics 504 and a dispersive module 506, is dispersive, but without the slit. The focal plane arrangement 508, examples of which are described below, consists of a replicated set of detector array segments laterally shifted in the dispersion direction. Each array segment consists of a two-dimensional array of filtered detector elements, or alternatively, each segment may comprise a set of one-dimensional arrays arranged in the orthogonal dimension. For each segment, the filter characteristics are matched to the dispersion; that is, the spectral channels are spatially registered to view the same field angle. For a single detector segment, the configuration is analogous to a conventional dispersive spectrometer, assuming the filter bandwidths also match the spectral resolution of the spectrometer. But by using multiple segments which view different field angles, it is possible to increase the effective dwell time through segment-to-segment digital TDI. Thus, the invention preserves the important inter-band temporal simultaneity and spatial registration attributes of the dispersive spectrometer, while providing a path for increased dwell time, thereby reducing NESR, by virtue of the TDI. The TDI is preferably achieved off-chip; that is, the array is read out in frames and the proper shifted rows are digitally summed on a frame-to-frame basis.

For a hyperspectral sensor (characterized by measurement of the full spectrum across the spectral range), a multiple slit dispersive spectrometer arrangement may alternatively be employed. For multispectral operation (subset of spectral bands from hyperspectrum), the filtered concept provides additional degrees of freedom for design tradeoffs. This is illustrated in the following design examples.

EXAMPLE 1: Hyperspectral Sensor Design

Figure 6:
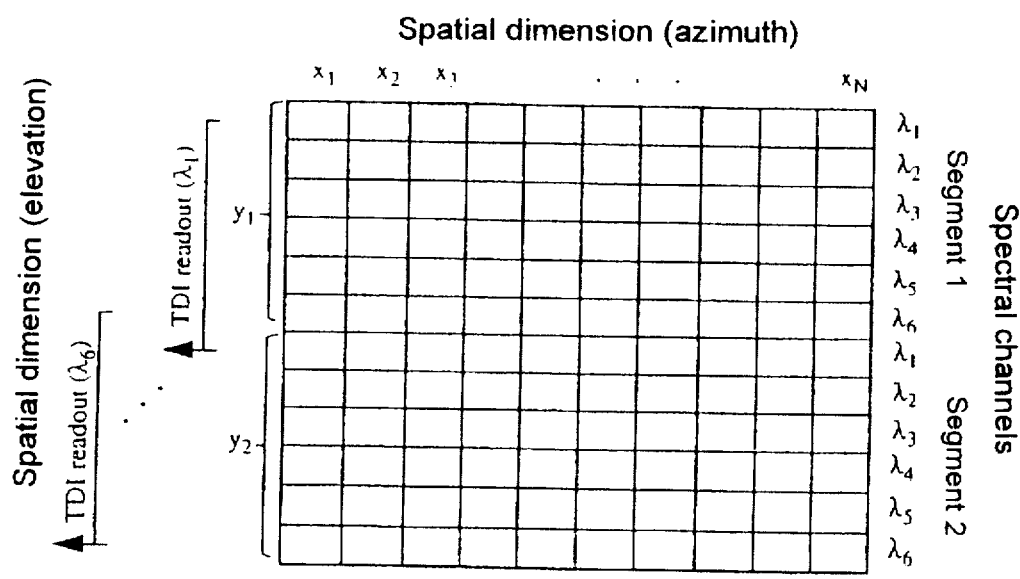
FIG. 6 represents a focal plane layout for a spectrometer according to this invention for use in a hyperspectral sensor application.

In a hyperspectral configuration, the spectral channels form a continuum. As such, the TDI segments form a discrete set of non-contiguous, equally spaced field angles. An example of the focal plane arrangement is shown in FIG. 6. To help illustrate this example, consider the design of a hyperspectral imaging sensor for the LWIR (8–12 micron) spectral region with 100-nm spectral resolution and 50-nm spectral sampling. Further assume a focal plane array 603 with 640×480 detector elements, each 50 microns in size. Such an array may be segmented into 8 segments such as 606 and 608, each with, say, 480 detectors in the spatial direction 610 and 80, for example, in the spectral direction. For use in the infrared, each segment may be covered with a filter assembly which ramps in center wavelength from 8 to 12 microns across the array, with 100-nm bandwidth throughout. The filter assembly may be in the form of a discrete filter array or a linear variable filter, and fabricated either on a separate substrate or coated directly onto the detector array.

If the spectrometer optics can be modified while maintaining f/3 performance with 50% optical transmission (1.1× $10^{-6}$ cm$^2$sr throughput), then a background limited NESR of 0.12 $\mu$W/cm$^2\mu$msr is achievable at 10 microns with a low quantum-efficiency detector such a Si:As ($\eta$=0.3) or 0.09 $\mu$W/cm$^2\mu$msr with a high quantum efficiency detector such as HgCdTe ($\eta$=0.6). If throughput is maintained at previously achievable levels, these results reduce to 0.09 $\mu$W/cm$^2\mu$msr and 0.06 $\mu$W/cm$^2\mu$msr, respectively, which come very close to the desired performance level. With a modestly reduced platform velocity it may be possible to achieve or exceed the desired NESR.

In addition to the need for a larger size, filtered focal plane array, the primary penalty of this approach is the need to stabilize the sensor over a longer time frame and match the v/h of the platform with the detector frame rate. The stabilization time is the product of the number of spectral channels, number of TDI segments, and the dwell time per pixel, or, for this example, 3.2 seconds. Using a half pixel criterion, the v/h match is one part in twice the product of the number of bands and TDI segments, or one part in 1280 for this example. These are both challenging, although it should be stressed that by design the spectral correlation characteristics are not degraded with stabilization and TDI rate match errors, but only the spatial resolution. Also, the raw detector array frames can be acquired such that: (1) the number of TDI segments can be adjusted in the data processing; and (2) the TDI segments can be reregistered prior to integration. The spectral channels within a segment are automatically registered to each other.

EXAMPLE 2: Multispectral Sensor Design

Measurement results have indicated that for specified detection problems, a small set of spectral bands may be used to provide excellent detection results. In this case, it is not necessary to acquire the entire hyperspectrum, and significant tradeoffs can be made simultaneously realized with the TDI dispersive sensor concept to improve performance and relax the detector, spectrometer, and stabilization requirements.

As an example, consider a detector array segment consisting of four rows of detectors filtered to 100 nm bandwidth with 9.35, 9.65, 9.95, and 10.25 micron band centers, which provides very good performance for various targets, weather conditions, and time of day. If the dispersion of the spectrometer subsystem is relaxed to provide only 300 nm dispersion between adjacent detector elements (a 6× reduction) replicating this 64 times results in a 256×N focal plane array, where N is chosen to obtain the desired cross-track FOV.

Figure 7:
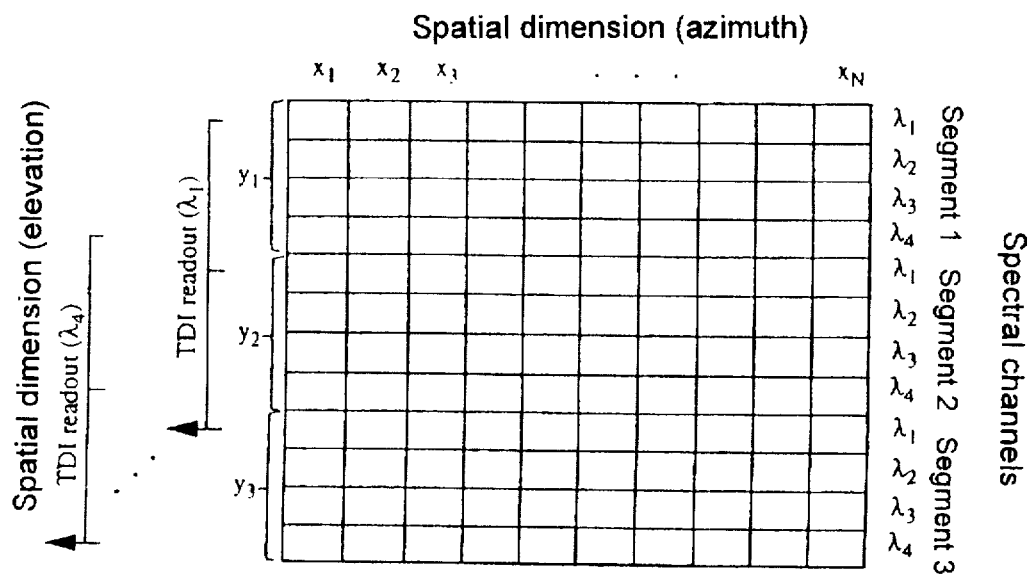
FIG. 7 represents a focal plane layout for a spectrometer according to this invention in a multispectral sensor application.
Figure 8:
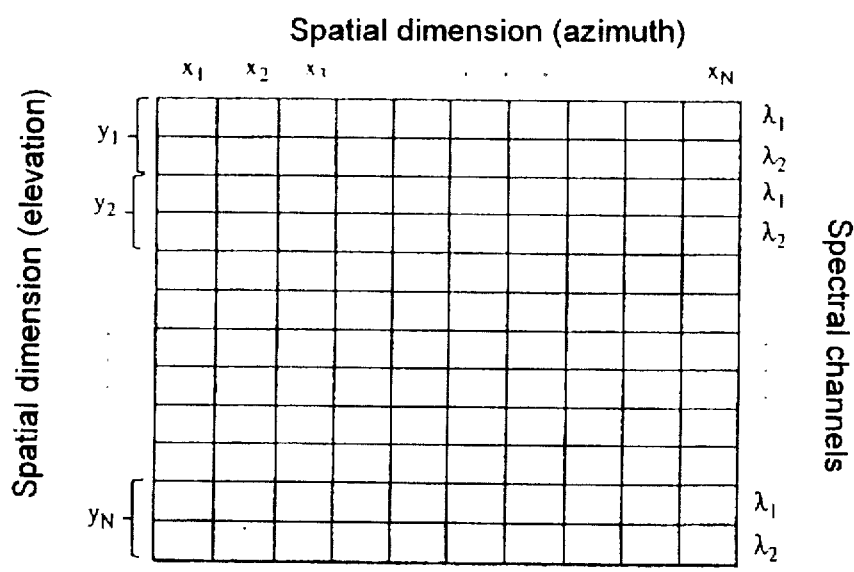
FIG. 8 represents a focal plane layout for a dual-band framing sensor according to the present invention.

FIG. 7 illustrates the focal plane arrangement for three segments. The spectrometer design is less challenging because of the significantly reduced dispersion, making it possible to increase throughput. Even without increasing the throughput relative to the SEBASS sensor and using low-quantum-efficiency Si:As detectors, the NESR is reduced by the 64 TDI to 0.03 $\mu$W/cm$^2\mu$msr. As a result of the reduced number of bands, the stabilization and TDI rate match requirements are relaxed by a factor of 2.5 relative to the hyperspectral case, even with the full 8× increase in TDI.

The ability to easily implement a multispectral sensor design using this technique depends on the locations of the spectral bands. In the above example, the three desired bands were separated by a multiple of 300 nm. Therefore, a four-band set could be easily implemented (assuming roughly constant angular dispersion) with an extra fourth band. There may be band combinations for which this will not work as well, although the hyperspectral case represents the worst-case situation.

EXAMPLE 3: Framing Dual-band FLIR

In some instances, dual-band combinations offer substantial target detection performance gain relative to broadband or single-band image sensing. A framing sensor embodiment may represent an attractive approach for a dual-band forward-looking infrared radar (FLIR). Consider a design utilizing a 256×256 framing array with alternating striped filters along one direction with 9.25 and 9.5 micron band centers, and a dispersion of 250 nm per pixel in this same direction. In the forward-looking case, the image does not move quickly across the focal plane. Therefore, both focal plane directions could be used for imaging with TDI in the time dimension (i.e., frame averaging). Correlation tracking may also be used, if needed, to minimize spatial resolution loss through TDI.

SENSOR FEASIBILITY

The primary component requirements for fabricating a sensor of the type presented are: (1) dispersive module with low spatial-spectral distortion over a relatively large focal plane; (2) precisely fabricated wedge or patterned IR spectral filter assemblies; and (3) moderate- to large-area IR focal plane arrays.

The requirements of the dispersive module are similar to the performance of the SEBASS design. For the hyperspectral example, which is clearly the most challenging, there is an additional requirement to achieve acceptable spectrometer performance over a larger field in the dispersive direction to accommodate the multiple TDI segments. This may be particularly challenging but technologically feasible. For the multispectral and dual-band examples, the dispersive module components are somewhat relaxed relative to the SEBASS performance in terms of reduced dispersion with a similar or smaller image field. These cases do not present an extremely difficult dispersive module design.

The spectral filter assembly needs are directly in line with current technologies for pattered multilayer IR spectral filter fabrication. Wedge filters with similar characteristics to the hyperspectral segment have been demonstrated by spatially controlled coating processes, either on the IR focal plane array itself, or on an IR transmitting substrate which is then placed in front of the focal plane. In the latter case, the design may be spatially replicated by piecing together multiple filters, subject to alignment issues.

In the case of the multispectral and dual-band examples, the requirement is a patterned coating with discrete filters striped across the detector rows. Two-dimensional patterned IR bandpass filters have previously been fabricated using microlithographic patterning and liftoff techniques. This process is relatively expensive, but capable of providing filters with similar filter characteristics, as needed. The primary difficulty is achieving smaller filter element sizes. A 100-micron pitch has been demonstrated on a 500-micron substrate.

The IR focal plane array requirements are also in line with the current state-of-the-art. Once again, the hyperspectral example presents the greatest difficulty. While MWIR and LWIR arrays with 640×480 elements have been demonstrated, they generally have a detector element size on the order of 20 to 30 microns. A larger detector size is desired both to provide a higher sensor throughput (better sensitivity) and relax the filter requirements.

The multispectral and dual-band examples present less stressing focal plane array requirements. For these examples, the detector count can be on the order of 256×256 such that a larger detector element size is achievable. Of course, with advances in IR focal plane array and spectral filtering technologies, larger focal plane array sizes will be feasible, providing increased ground and/or spectral coverage.

What is claimed is:

1. In an imaging spectrometer of the type including a focal-plane array having a dispersive dimension, the improvement comprising:

a focal-plane arrangement having one or more sets of detector array segments, each such segment being laterally shifted in the dispersive dimension and optically filtered to spatial register the dispersion associated therewith;

fore-optics, including an aperture sized to permit each set of detector array segments to view a different field angle of a scene of interest; and electronics coupled to the focal-plane arrangement to perform a time-delay-integrate (TDI) operation on a segment-by-segment basis, and generate a spectral image representative of the scene of interest.

2. The improved imaging spectrometer of claim 1, wherein at least the fore-optics and focal-plane arrangement are airborne to gather data in a second dimension during flight and image the data onto replicated sets of detector elements.

3. The improved imaging spectrometer of claim 1, wherein the spectral image is a thermal image.

4. The improved imaging spectrometer of claim 1, wherein the time-delay-integrate (TDI) operation is performed with respect to an individual segment to achieve a hyperspectral sensing configuration.

5. The improved imaging spectrometer of claim 1 wherein the time-delay-integrate (TDI) operation is performed with respect to multiple, overlapping segments to achieve a multispectral sensing configuration.

6. A high-sensitivity imaging spectrometer, comprising:

a platform moving in a first spatial dimension relative to a field of interest;

fore-optics supported on the platform to collect optical energy in the form of a plurality of multispectral segments, including an aperture sized to permit the passage of one or more segments representative of different field angles;

a dispersive module operative to wavelength separate each multispectral segment into a plurality of individual wavelength channels, each channel including a plurality of data points arranged along a second spatial dimension;

a focal-plane image sensor having a two-dimensional array of optoelectric detector elements arranged as rows and columns, the image sensor being supported relative to the dispersive module such that the wavelength channels of the multispectral segments fall onto different rows of the image sensor, with the data points within the wavelength channels falling onto different columns of the image sensor;

a plurality of wavelength-specific filters disposed in an optical path between the dispersive module and the focal-plane image sensor, each filter being matched to selectively pass the various individual wavelength channels; and electronic circuitry in electrical communication with the optoelectric elements of the focal-plane image sensor, the circuitry being operative to generate a spectral image representative of the field of interest.

7. The high-sensitivity imaging spectrometer of claim 6, including electronic circuitry operative to perform a time-delay-integrate (TDI) function on the segments to generate the spectral image.

8. The high-sensitivity imaging spectrometer of claim 6, wherein the TDI function is performed with respect to each wavelength channel across each segment to realize a hyperspectral image.

9. The high-sensitivity imaging spectrometer of claim 6, wherein the TDI function is performed with respect to each segment across multiple segments to realize a multispectral image.

10. The high-sensitivity imaging spectrometer of claim 6, wherein the wavelength-specific filters are disposed directly onto the focal-plane image sensor.

11. The high-sensitivity imaging spectrometer of claim 6, further including an optically transmissive substrate onto which the wavelength-specific filters are disposed.

* * * * *